United States Patent
Wang et al.

(10) Patent No.: US 9,712,833 B2
(45) Date of Patent: Jul. 18, 2017

(54) SYSTEM AND METHOD FOR INDICATING TEMPORAL LAYER SWITCHING POINTS

(75) Inventors: Ye-Kui Wang, Tampere (FI); Miska Hannuksela, Ruutana (FI)

(73) Assignee: Nokia Technologies Oy, Espoo (FI)

(*) Notice: Subject to any disclaimer, the term of this patent is extended or adjusted under 35 U.S.C. 154(b) by 842 days.

(21) Appl. No.: 12/215,244

(22) Filed: Jun. 25, 2008

(65) Prior Publication Data

US 2009/0003439 A1 Jan. 1, 2009

Related U.S. Application Data

(60) Provisional application No. 60/946,379, filed on Jun. 26, 2007.

(51) Int. Cl.
| | | |
|---|---|---|
| H04N 7/12 | (2006.01) | |
| H04N 19/31 | (2014.01) | |
| H04N 19/70 | (2014.01) | |

(52) U.S. Cl.
CPC .............. *H04N 19/31* (2014.11); *H04N 19/70* (2014.11)

(58) Field of Classification Search
CPC .... H04N 19/31; H04N 19/70; H04N 21/2662; H04N 19/30; H04N 21/21805
USPC ............ 375/240.01, 240.03, 240.08, 240.11, 375/240.16, 240.25, 240.26; 382/238
IPC ...................................................... H04N 11/02
See application file for complete search history.

(56) References Cited

U.S. PATENT DOCUMENTS

| | | | |
|---|---|---|---|
| 5,963,257 A * | 10/1999 | Katata et al. ............ 375/240.11 |
| 7,010,043 B2 | 3/2006 | Kerofsky et al. ........ 375/240.19 |
| 7,082,164 B2 | 7/2006 | Chaddha .................. 375/240.12 |
| 8,040,952 B2 * | 10/2011 | Park ................. H04N 21/21805 |
| | | | 375/240.01 |
| 2002/0064227 A1 | 5/2002 | Van Der Schaar et al. ........................ 375/240.11 |
| 2005/0129123 A1 | 6/2005 | Xu et al. .................. 375/240.16 |
| 2006/0072661 A1 | 4/2006 | Kim et al. ............... 375/240.08 |
| 2006/0230162 A1 | 10/2006 | Chen et al. .................... 709/229 |
| 2006/0233242 A1 | 10/2006 | Wang et al. ............. 375/240.08 |
| 2007/0116277 A1 | 5/2007 | Ro et al. ....................... 380/201 |
| 2007/0121723 A1 | 5/2007 | Mathew et al. ......... 375/240.12 |
| 2007/0150784 A1 | 6/2007 | Pan et al. ...................... 714/746 |
| 2007/0230564 A1 * | 10/2007 | Chen et al. .............. 375/240.01 |
| 2007/0230566 A1 * | 10/2007 | Eleftheriadis .......... H04N 19/30 |
| | | | 375/240.1 |
| 2008/0046939 A1 | 2/2008 | Lu et al. .......................... 725/90 |
| 2008/0095235 A1 | 4/2008 | Hsiang ..................... 375/240.13 |
| 2008/0181298 A1 * | 7/2008 | Shi et al. .................. 375/240.03 |
| 2008/0253671 A1 * | 10/2008 | Choi et al. ..................... 382/238 |

(Continued)

OTHER PUBLICATIONS

"Signaling of temporal layer switching points", Ye-Kui Wang et al., ISO/IEC JTC1/SC29/WG11, MPEG/M14527, Apr. 2007, 2 pgs.

(Continued)

*Primary Examiner* — Gims Philippe
*Assistant Examiner* — Richard Carter
(74) *Attorney, Agent, or Firm* — Harrington & Smith

(57) ABSTRACT

Disclosed are a system, apparatus, computer programs and methods for indicating proper temporal layer switching points for temporal scalable coding. Various embodiments provide an apparatus and method for properly indicating temporal layer switching points in a scalable video bit stream or in a scalable video file container. Using these indications, a decoder can determine where to perform temporal layer switching, after which all of the pictures at and below the desired temporal layer can be correctly decoded.

55 Claims, 7 Drawing Sheets

7A — ENCODING A TEMPORAL SCALABLE VIDEO BIT STREAM INCLUDING AN INDICATION OF AT LEAST ONE TEMPORAL LAYER SWITCHING POINT FROM A FIRST TEMPORAL LAYER TO A SECOND TEMPORAL LAYER, WHERE THE INDICATION INCLUDES INFORMATION CONCERNING WHERE DECODING OF THE FIRST TEMPORAL LAYER SHOULD START TO ENABLE SWITCHING FROM THE FIRST TEMPORAL LAYER TO THE SECOND TEMPORAL LAYER AT THE AT LEAST ONE TEMPORAL LAYER SWITCHING POINT

7B — AT LEAST ONE OF STORING THE ENCODED VIDEO BIT STREAM AND SENDING THE ENCODED VIDEO BIT STREAM TO A DECODER

(56) References Cited

U.S. PATENT DOCUMENTS

2009/0116562 A1* 5/2009 Eleftheriadis ...... H04N 21/2662
                                                    375/240.26
2010/0020884 A1* 1/2010 Pandit et al. ............ 375/240.25

OTHER PUBLICATIONS

"SVC temporal layer switching points", Ye-Kui Wang et al., Joint Video Team (JVT) of ISO/IEC MPEG & ITU-T VCEG, ISO/IEC JTC1/SC29/WG11 and ITU-T SG16 Q.6, Jun.-Jul. 2007, 6 pgs.

"Showcase of Temporal Level Switching Point SEI Message", Ci He et al., Joint Video Team (JVT) of ISO/IEC MPEG & ITU-T VCEG (ISO/IEC JTC1/SC29/WG11 and ITU-T SG16 Q.6, Oct. 2007, pp. 1-3.

"On SVC file format", Ye-Kui Wang et al., ISO/IEC JTC1/SC29/WG11 M14620, Jul. 2007, 6 pgs.

"Showcase for the Temporal Level Nesting Flag", Alex Eleftheriadis et al., Joint Video Team (JVT) of ISO/IEC MPEG & ITU-T VCEG (ISO/IEC JTC1/SC29/WG11 and ITU-T SG16 Q.6), Jan. 2007, pp. 1-8.

D. Yoon et al., "Indication of Key Picture in AVC Compatible Base Layer", Joint Video Team of ISO/IEC MPEG & ITU-T VCEG (ISO/IEC JTC1/SC29/WG11 and ITU-T SG16 Q.6), $16^{th}$ Meeting: Poznan, PL, Jul. 24-29, 2005.

"Joint Draft 3.0 on Multiview Video Coding", Joint Video Team (JVT) of ISO/IEC MPEG & ITU-T VCEG, $23^{rd}$ JVT meeting, San Jose, USA, Apr. 2007, 38 pgs.

"Joint Draft 10 of SVC Amendment", Joint Video Team (JVT) of ISO/IEC MPEG & ITU-T VCEG, $23^{rd}$ meeting, San Jose, USA, Apr. 2007, 550 pgs.

\* cited by examiner

| TI_switching_point(payloadsize){ | C | DESCRIPTOR |
|---|---|---|
| delta_frame_num | 0 | SE(V) |
| } | | |

7A — ENCODING A TEMPORAL SCALABLE VIDEO BIT STREAM INCLUDING AN INDICATION OF AT LEAST ONE TEMPORAL LAYER SWITCHING POINT FROM A FIRST TEMPORAL LAYER TO A SECOND TEMPORAL LAYER, WHERE THE INDICATION INCLUDES INFORMATION CONCERNING WHERE DECODING OF THE FIRST TEMPORAL LAYER SHOULD START TO ENABLE SWITCHING FROM THE FIRST TEMPORAL LAYER TO THE SECOND TEMPORAL LAYER AT THE AT LEAST ONE TEMPORAL LAYER SWITCHING POINT

7B — AT LEAST ONE OF STORING THE ENCODED VIDEO BIT STREAM AND SENDING THE ENCODED VIDEO BIT STREAM TO A DECODER

FIG.7

8A — RECEIVING A TEMPORAL SCALABLE VIDEO BIT STREAM THAT INCLUDES AN INDICATION OF AT LEAST ONE TEMPORAL LAYER SWITCHING POINT FROM A FIRST TEMPORAL LAYER TO A SECOND TEMPORAL LAYER, WHERE THE INDICATION INCLUDES INFORMATION CONCERNING WHERE DECODING OF THE FIRST TEMPORAL LAYER SHOULD START TO ENABLE SWITCHING FROM THE FIRST TEMPORAL LAYER TO THE SECOND TEMPORAL LAYER AT THE AT LEAST ONE TEMPORAL LAYER SWITCHING POINT

8B — DECODING THE RECEIVED TEMPORAL SCALABLE VIDEO BIT STREAM

FIG.8

SYSTEM AND METHOD FOR INDICATING TEMPORAL LAYER SWITCHING POINTS

CLAIM OF PRIORITY FROM COPENDING PROVISIONAL PATENT APPLICATION

This patent application claims priority under 35 U.S.C. §119(e) from Provisional Patent Application No. 60/946,379, filed Jun. 26, 2007, the disclosure of which is incorporated by reference herein in its entirety.

FIELD OF THE INVENTION

The exemplary embodiments of this invention relate generally to video coding and the storage of video content. More particularly, these exemplary embodiments relate to the signaling of temporal layer switching points in temporal scalable video bit streams or file containers.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 Advanced Video Coding (AVC)). In addition, there are currently efforts underway with regards to the development of new video coding standards. One such standard under development is the scalable video coding (SVC) standard, which will become the scalable extension to H.264/AVC. Another such standard under development is the multi-view video coding (MVC), which will become another extension to H.264/AVC.

The latest draft of the SVC standard, at the time of filing the priority patent application, the Joint Draft 10, is available in JVT-W201, "Joint Draft 10 of SVC Amendment", 23rd JVT meeting, San Jose, USA, April 2007, available at ftp3.itu.ch/av-arch/jvt-site/2007_04_SanJose/JVT-W201.zip. The latest joint draft of MVC, at the time of filing the priority application, is available in JVT-W209, "Joint Draft 3.0 on Multiview Video Coding", 23rd JVT meeting, San Jose, USA, April 2007, available from ftp3.itu.ch/av-arch/jvt-site/2007_04_SanJose/JVT-W209.zip.

The earliest type scalability introduced to video coding standards was temporal scalability with B pictures in MPEG-1 Visual. In the B picture concept, a B picture is bi-predicted from two pictures, one preceding the B picture and one succeeding the B picture, both in display order. In addition, a B picture is a non-reference picture, i.e., it is not used for inter-picture prediction reference by other pictures. Consequently, the B pictures could be discarded to achieve a temporal scalability point with a lower frame rate. The same mechanism was retained in MPEG-2 Video, H.263 and MPEG-4 Visual.

In H.264/AVC, the concept of B pictures or B slices has been changed. The definition of B slice is as follows: A slice that may be decoded using intra-prediction from decoded samples within the same slice or inter-prediction from previously decoded reference pictures, using at most two motion vectors and reference indices to predict the sample values of each block. Both the bi-directional prediction property and the non-reference picture property of the conventional B picture concept are no longer valid. A block in a B slice may be predicted from two reference pictures in the same direction in display order, and a picture consisting of B slices may be referred by other pictures for inter-picture prediction.

In the previous video coding standards the display order and the decoding order of the pictures were closely related, i.e., the display order was pre-determined for a decoding order. On the other hand, H264 enables the explicit signaling of the output order of the pictures. A value of picture order count (POC) is derived from related syntax elements for each picture and is non-decreasing with increasing picture position in output order relative to the previous independent decoding refresh (IDR) picture or a picture containing a memory management control operation marking all pictures as "unused for reference."

In H.264/AVC, SVC and MVC, temporal scalability can be achieved by using non-reference pictures and/or a hierarchical inter-picture prediction structure. By using only non-reference pictures, it is possible to achieve temporal scalability in a manner similar to using conventional B pictures in MPEG-1/2/4, by discarding non-reference pictures. A hierarchical coding structure can achieve more flexible temporal scalability.

FIG. 1 presents a typical hierarchical coding structure with four levels of temporal scalability. The display order is indicated by the values denoted as picture order count (POC). The I or P pictures, also referred to as key pictures, are coded as the first picture of a group of pictures (GOPs) in decoding order. When a key picture is inter coded, the previous key pictures are used as reference for inter-picture prediction. These pictures correspond to the lowest temporal level (denoted as TL in the figure) in the temporal scalable structure and are associated with the lowest frame rate. Pictures of a higher temporal level may only use pictures of the same or lower temporal level for inter-picture prediction.

With such a hierarchical coding structure, different temporal scalability corresponding to different frame rates can be achieved by discarding pictures of a certain temporal level value and beyond. In FIG. 1, for example, the pictures 0, 8 and 16 are of the lowest temporal level, while the pictures 1, 3, 5, 7, 9, 11, 13 and 15 are of the highest temporal level. Other pictures are assigned with other temporal levels hierarchically. These pictures of different temporal levels enable decoding of the bit stream at different frame rates. When decoding all of the temporal levels, a frame rate of 30 Hz can be obtained. Other frame rates can be obtained by discarding pictures of some temporal levels. The pictures of the lowest temporal level are associated with a frame rate of 3.25 Hz. A temporal scalable layer with a lower temporal level or a lower frame rate is referred to as a lower temporal layer.

The above hierarchical B picture coding structure is the most typical coding structure for temporal scalability. However, it should be noted that much more flexible coding structures are possible. For example, the GOP size does not have to be constant over time. As another example, the temporal enhancement layer pictures do not have to be coded as B slices; they may also be coded as P slices.

Supplemental Enhancement Information (SEI) messages are syntax structures that can be included in H.264/AVC bit streams. SEI messages are not required for the decoding of the sample values in output pictures but assist in related processes, such as picture output timing, rendering, error detection, error concealment, and resource reservation. A number of SEI messages are specified in H.264/AVC, SVC, and MVC. The user data SEI messages enable organizations and companies to specify SEI messages for their own use. The H.264/AVC, SVC, or MVC standard contains the syntax and semantics for the specified SEI messages, but no process for handling the messages in the decoder is defined. Consequently, encoders are required to follow the standard when they create SEI messages, and decoders conforming to the standard are not required to process SEI messages for output order conformance.

The scalability structure in SVC is characterized by three syntax elements: temporal_id, dependency_id and quality_id. The syntax element temporal_id is used to indicate the temporal scalability hierarchy or, indirectly, the frame rate. A scalable layer representation comprising pictures of a smaller maximum temporal_id value has a smaller frame rate than a scalable layer representation comprising pictures of a greater maximum temporal_id. A given temporal layer typically depends on the lower temporal layers (i.e., the temporal layers with smaller temporal_id values) but never depends on any higher temporal layer. The syntax element dependency_id is used to indicate the coarse granular scalability (CGS) inter-layer coding dependency hierarchy (which includes both signal-to-noise and spatial scalability). At any temporal level location, a picture of a smaller dependency_id value may be used for inter-layer prediction for coding of a picture with a greater dependency_id value. The syntax element quality_id is used to indicate the quality level hierarchy of a fine granular scalability (FGS) or medium granular scalability (MGS) layer. At any temporal location, and with an identical dependency_id value, a picture with quality_id equal to QL uses the picture with quality_id equal to QL-1 for inter-layer prediction. A coded slice with quality_id larger than 0 may be coded as either a truncatable FGS slice or a non-truncatable MGS slice. For simplicity, all of the data units (i.e. Network Abstraction Layer units or NAL units in the SVC context) in one access unit having identical value of dependency_id are referred to as a dependency unit or a dependency representation. Within one dependency unit, all the data units having identical value of quality_id are referred to as a quality unit or layer representation.

In H.264/AVC, the temporal level may be signaled by the sub-sequence layer number in the sub-sequence information SEI messages. The sub-sequence information SEI message maps a coded picture to a certain sub-sequence and sub-sequence layer. The sub-sequence SEI message may also include a frame number that increments by one per each reference frame in the sub-sequence in decoding order. Furthermore, the sub-sequence information SEI message includes an indication if a non-reference picture precedes the first reference picture of the sub-sequence, if a reference picture is the first reference picture of the sub-sequence, and if a picture is the last picture of the sub-sequence. The sub-sequence layer characteristics SEI message and the sub-sequence characteristics SEI message give statistical information, such as bit rate, on the indicated sub-sequence layer and sub-sequence, respectively. Furthermore, the dependencies between sub-sequences are indicated in the sub-sequence characteristics SEI message.

In SVC and MVC the temporal level is signaled in the Network Abstraction Layer unit header by the syntax element temporal_id. The bit rate and frame rate information for each temporal level is signaled in the scalability information SEI message.

In H.264/AVC, sub-sequence information SEI messages can be used to signal temporal scalable layers. Within one temporal layer (also referred to as a sub-sequence layer), the first picture in decoding order in a sub-sequence does not refer to any other picture in the same temporal layer. Therefore, if the decoding of the next lower layer has been started since the beginning of the bit stream, the decoding can be switched to the current layer at the first picture in decoding order of any sub-sequence of the current layer. However, if the decoding of the next lower layer has not started since the beginning of the bit stream, it is also possible that the temporal layer switching cannot be operated at the first picture in decoding order of a sub-sequence. For example, when a first picture picA1 in decoding order of a sub-sequence of a temporal layer layerA uses a decoded picture picB1 in the next lower layer layerB for inter prediction reference, if the decoding of the next lower layer layerB is started after picture picB1 in decoding order, then switching to the temporal layer layerA cannot be operated at picA1, because picA1 cannot be correctly decoded.

| layerA | . . . | | picA1 picA2 picA3 |
|---|---|---|---|
| layerB | picB1 picB2 . . . | | |

While a sub-sequence characteristics SEI message can be used to indicate the prediction relationship of the sub-sequences carrying pictures picA1 and picB1, its use may not be straightforward in bit stream manipulation, as it requires the constant book-keeping of sub-sequence dependencies and the mapping between pictures and sub-sequences. This is undesirable in, for example, gateways. Furthermore, the sub-sequence characteristics SEI message is not capable of indicating prediction dependencies of single pictures. Therefore, the concluded decoding starting position in the next lower temporal layer may be too conservatively selected based on the sub-sequence characteristics SEI message.

In SVC, the scalability information SEI message includes a syntax element temporal_id_nesting_flag. If temporal_id_nesting_flag is equal to 1, and if the decoder is currently decoding a temporal layer X, then the decoding can be switched from temporal_id X to temporal_id Y>X after any picture picX with temporal_id equal to X. This can be done by continuing decoding all pictures with temporal_id<=Y that follow the picture picX in decoding order. In other words, the switching of temporal layers to temporal_id Y is possible at any point, as long as all those immediately preceding pictures that have a lower temporal_id are decoded. However, it is possible to have temporal_id_nesting_flag equal to 0 in order to have a higher coding efficiency. In this case, there is no way to know at which pictures the decoding can be switched to higher temporal layers.

A sample grouping in the ISO base media file format and its derivatives, such as the AVC file format and the SVC file format, is an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. Sample groupings are represented by two linked data structures: (1) a SampleToGroup box represents the assignment of samples to sample groups; (2) a SampleGroupDescription box contains a sample group entry for each sample group describing the properties of the group. There may be multiple instances of the SampleToGroup and SampleGroupDescription boxes based on different grouping criteria. These are distinguished by a type field used to indicate the type of grouping.

Each SVC Scalable Group Entry of the SVC file format documents a portion of the bit stream. Each group is associated with a tier, where tiers define a set of operating points within a track, providing information about the operating points and instructions on how to access bit stream portions. Tiers represent layers of a SVC bit stream. Each SVC Scalable Group Entry documents and describes the various possible scalable operating points present within an SVC Elementary Stream. These entries are defined using a grouping type of "scif". Though the Scalable Group entries are contained in the SampleGroupDescription box, the grouping is not a true sample grouping as each sample may be associated with more than one scalable group, as these groups are used to describe sections of the samples, i.e., the NAL units. As a result, it is possible that there may not be a SampleToGroup box of the grouping type "scif", unless it happens that a group does, in fact, describe an entire sample. Even if a SampleToGroup box of the grouping type "scif" is present, the information is not needed for extraction of NAL units of tiers; the map groups must always document the "pattern" of NAL units within the samples.

In the SVC file format, a one-bit field is_tl_switching_point is included in the syntax structure ScalableGroupEntry( ). When is_tl_switching_point is equal to 1, the identified pictures are temporal layer switching points, such that switching from the next lower temporal layer can be operated at any of the identified pictures. These temporal layer switching points are equivalent to the first pictures in decoding order of sub-sequences signaled by sub-sequence information SEI messages. Therefore, the same problem arises as is discussed above with regard to H.264/AVC. In other words, when the decoding of the next lower layer is not started from the beginning of the bit stream, temporal layer switching may not be conducted at the indicated temporal layer switching points.

SUMMARY OF THE EXEMPLARY EMBODIMENTS OF THIS INVENTION

The various exemplary embodiments of this invention provide a system and method for indicating proper temporal layer switching points for temporal scalable coding. More particularly, the various exemplary embodiments provide apparatus and methods for properly indicating temporal layer switching points in, for example, a scalable video bit stream or in a scalable video file container. Using these indications, a decoder can determine where to perform temporal layer switching, after which all of the pictures at and below the desired temporal layer can be correctly decoded.

In accordance with a first aspect thereof these exemplary embodiments provide a method that includes encoding a temporal scalable video bit stream including an indication of at least one temporal layer switching point from a first temporal layer to a second temporal layer, and at least one of storing the encoded video bit stream and sending the encoded video bit stream to a decoder. In the method the indication includes information concerning where decoding of the first temporal layer should start to enable switching from the first temporal layer to the second temporal layer at the at least one temporal layer switching point.

In accordance with a second aspect thereof these exemplary embodiments provide an apparatus that includes a processor and a memory communicatively connected to the processor and including computer code configured to encode a temporal scalable video bit stream including an indication of at least one temporal layer switching point from a first temporal layer to a second temporal layer. The indication includes information concerning where decoding of the first temporal layer should start to enable switching from the first temporal layer to the second temporal layer at the at least one temporal layer switching point.

In accordance with a further aspect thereof these exemplary embodiments provide an apparatus that includes means for encoding a temporal scalable video bit stream including an indication of at least one temporal layer switching point from a first temporal layer to a second temporal layer. The apparatus further includes means for at least one of storing the encoded video bit stream and sending the encoded video bit stream to a decoder. The indication includes information concerning where decoding of the first temporal layer should start to enable switching from the first temporal layer to the second temporal layer at the at least one temporal layer switching point.

In accordance with a still further aspect thereof these exemplary embodiments provide a method that includes receiving a temporal scalable video bit stream that includes an indication of at least one temporal layer switching point from a first temporal layer to a second temporal layer; and decoding the received temporal scalable video bit stream. In this method the indication includes information concerning where decoding of the first temporal layer should start to enable switching from the first temporal layer to the second temporal layer at the at least one temporal layer switching point.

In accordance with a further aspect thereof these exemplary embodiments provide an apparatus that includes a processor and a memory unit communicatively connected to the processor and including computer code configured to decode a temporal scalable video bit stream including an indication of at least one temporal layer switching point from a first temporal layer to a second temporal layer. The indication includes information concerning where decoding of the first temporal layer should start to enable switching from the first temporal layer to the second temporal layer at the at least one temporal layer switching point.

In accordance with yet another aspect thereof these exemplary embodiments provide an apparatus having means for receiving a temporal scalable video bit stream that includes an indication of at least one temporal layer switching point from a first temporal layer to a second temporal layer. The apparatus further has means for decoding the received temporal scalable video bit stream. The indication includes information concerning where decoding of the first temporal layer should start to enable switching from the first temporal layer to the second temporal layer at the at least one temporal layer switching point.

In accordance with a further aspect thereof these exemplary embodiments provide a method that comprises encoding video content and transmitting the encoded video content as a temporal scalable bit stream comprising a first temporal layer, a second temporal layer, and an indication of at least one temporal layer switching point from the first temporal layer to the second temporal layer. The indication includes information concerning where decoding of the first temporal layer should start to enable switching from the first temporal layer to the second temporal layer at the at least one temporal layer switching point. In the method the second temporal layer is transmitted starting from the at least one temporal layer switching point only if the first temporal layer is transmitted at or before the information of where decoding of the first temporal layer should start.

In accordance with another aspect thereof these exemplary embodiments provide an apparatus that includes a processor and a memory unit communicatively connected to the processor and including computer code configured to transmit a temporal scalable bit stream comprising a first temporal layer, a second temporal layer, and an indication of at least one temporal layer switching point from the first temporal layer to the second temporal layer. The indication includes information concerning where decoding of the first temporal layer should start to enable switching from the first temporal layer to the second temporal layer at the at least one temporal layer switching point. The second temporal layer is transmitted starting from the at least one temporal layer switching point only if the first temporal layer is transmitted at or before the information of where decoding of the first temporal layer should start.

In accordance with a further aspect thereof these exemplary embodiments provide an apparatus that comprises means for encoding video content and means for transmitting the encoded video content as a temporal scalable bit stream comprising a first temporal layer, a second temporal layer, and an indication of at least one temporal layer switching point from the first temporal layer to the second temporal layer. The indication includes information concerning where decoding of the first temporal layer should start to enable switching from the first temporal layer to the second temporal layer at the at least one temporal layer switching point. The second temporal layer is transmitted starting from the at least one temporal layer switching point only if the first temporal layer is transmitted at or before the information of where decoding of the first temporal layer should start.

In accordance with a further aspect thereof these exemplary embodiments provide a method that comprises providing a video bit stream; and encoding the video bit stream to include a temporal layer switching point supplemental enhancement information SEI message having the form

| tl_switching_point( payloadSize ) { | C | Descriptor |
|---|---|---|
| delta_frame_num | 5 | se(v) |
| }. | | |

The temporal layer switching point SEI message is associated with a layer representation and constrained by delta_frame_num, where delta_frame_num indicates a difference of frame_num values between a switch-to layer representation and a target layer representation, where currFrameNum is a frame_num of the switch-to layer representation and targetFrameNum is a frame_num of a target layer representation, where targetFrameNum is set equal to currFrameNum−delta_frame_num, and where the target layer representation is a layer representation of a previous access unit, in decoding order, having frame_num equal to targetFrameNum, dependency_id equal to sei_dependency_id[i], and quality_id equal to sei_quality_id[i].

BRIEF DESCRIPTION OF THE DRAWINGS

In the attached Drawing Figures:

FIGS. 7, 8 and 9 are each a logic flow diagram descriptive of an embodiment of a method, and a result of execution of computer program instructions, in accordance with the exemplary embodiments of this invention.

DETAILED DESCRIPTION OF EXEMPLARY EMBODIMENTS

Described below are various exemplary embodiments of this invention that provide a system, apparatus, computer program instructions and method for indicating proper temporal layer switching points for temporal scalable coding. More particularly, the various exemplary embodiments provide a system and method for properly indicating temporal layer switching points in, for example, a scalable video bit stream or in a scalable video file container. Using these indications, a decoder can determine where to perform temporal layer switching, after which all of the pictures at and below the desired temporal layer can be correctly decoded.

In the exemplary embodiments a method for encoding video content comprises encoding a temporal scalable video bit stream, the bit stream including an indication of at least one temporal layer switching point from a first temporal layer to a second temporal layer. The indication further includes information concerning where the decoding of the first temporal layer should have started to enable switching from the first temporal layer to the second temporal layer at the at least one temporal layer switching point. More generally, the indication includes information about a point at which the decoding of the first temporal layer should have started to enable switching from the first temporal layer to the second temporal layer at the at least one temporal layer switching point. A method for decoding such a scalable video bit stream is also provided.

Figures 5, 6:
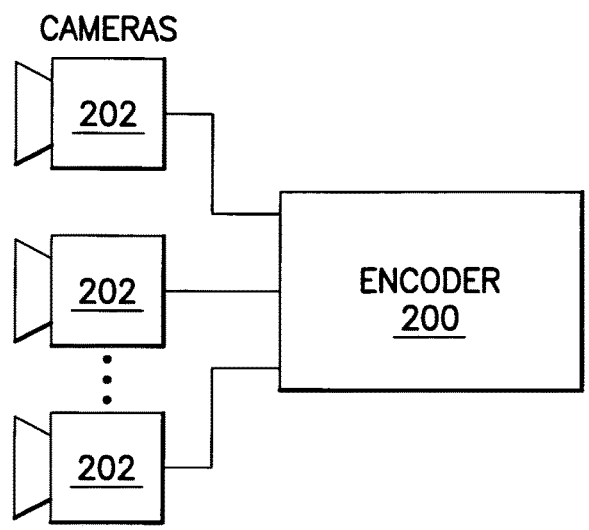
FIG. 5 is a simplified block diagram of an encoder arranged with a plurality of image sources (cameras).
FIG. 6 illustrates one exemplary embodiment of syntax for a temporal layer switching point SEI message that is an aspect the exemplary embodiments of this invention.

One non-limiting example of an encoder operation of this invention is as follows. As shown in FIG. 5, an encoder 200 is connected with some number of video sources corresponding to fixed cameras 202 pointing in fixed directions. For example, the camera arrangement may be used to capture a talk show. The program is composed from the input of the cameras 202 such that there are relatively frequent changes between cameras. The encoder 200 is configured to create a GOP pattern with a hierarchical B or P picture coding structure. For example, temporal layers from 0 to 5 may be used and the size of a GOP may be 32 pictures. Hence, a particular shot may be shorter in duration than GOP. Assume that a constant hierarchical B or P coding structure is used. The use of a constant GOP pattern is helpful in providing constant fast-forward playback rates, for example. As a result of this coding arrangement, a shot change is not likely to occur at a GOP boundary, i.e., the first picture, in decoding order, after a shot change may not be at temporal layer 0. Rather than coding the first picture of a shot predictively from earlier pictures of the same GOP, or intra-coding the first picture of a shot, the best compression performance may be achieved when the first picture of the shot is inter-predicted from the previous picture of the same one of the cameras 202 coded at or below the temporal layer of the first picture of the shot. This means, however, that the temporal prediction hierarchy is not nested as required for setting the temporal_id_nesting_flag equal to 1. Furthermore, in order to switch temporal layers at a first picture of a shot, the first picture of the shot must be inter-predicted only from pictures of a lower temporal layer and those pictures must have been decoded. The encoder 200 in accordance with the embodiments described herein is capable of indicating whether temporal layer switching can happen at the first picture of a shot, and which prior pictures must have been decoded for performing correct temporal layer switching.

Various exemplary embodiments also provide a method for transmitting a scalable video bit stream. The bit stream comprises an indication of at least one temporal layer switching point from a first temporal layer to a second temporal layer. The indication also includes information concerning where the decoding of the first temporal layer should have started to enable switching from the first temporal layer to the second temporal layer at the at least one temporal layer switching point. The second temporal layer is transmitted starting from the at least one temporal layer switching point only if the first temporal layer is transmitted at or before the information of where decoding of the first temporal layer should have started.

According to one exemplary embodiment a new SEI message, referred to herein as a temporal layer switching point SEI message, is defined. The syntax for the temporal layer switching point SEI message may be as shown in FIG. 6.

In terms of semantics, when a temporal layer switching point SEI message is not included in a scalable nesting SEI message, the message applies to the target layer representation comprising the NAL units with nal_unit_type in the range of 1 to 5, inclusive, of the access unit containing the SEI message. When a temporal layer switching point SEI message is included in a scalable nesting SEI message, the message applies to the layer representations having dependency_id, quality_id, and temporal_id equal to dependency_id[i], quality_id[i], and temporal_id, respectively, as indicated in the scalable nesting SEI message. The semantics of the syntax elements apply independently to each target layer representation, i.e., each layer representation indicated by the values of dependency_id[i] and quality_id[i] of the scalable nesting SEI message containing the SEI message.

Temporal layer switching point SEI messages provide information of temporal layer switching points. If a layer representation is associated with a temporal layer switching point SEI message, then it is a temporal layer switching point as constrained by delta_frame_num. Otherwise, the layer representation is not a temporal layer switching point.

In the temporal layer switching point SEI message shown in FIG. 6 delta_frame_num indicates the difference of the frame_num values of the current layer representation and the target layer representation in the next lower temporal layer. The temporal_id of the current layer representation is identified as tId. As such, the next lower temporal layer has temporal_id equal to tId−1. When the decoding of the next lower layer has started from or before the target layer representation, the decoding can be switched to the current temporal layer at the current layer representation. The frame_num of the target layer representation, target_frame_num, is derived as follows, where CurrFrameNum is the frame_num of the current layer representation.

target_frame_*num*=*Curr*Frame*Num*−delta_frame_*num*

Alternatively, the syntax is defined such that loops of dependency_id and quality_id are included and a delta_frame_num is signaled for each combination of dependency_id and quality_id. In this case, the SEI message should not be included in a scalable nesting SEI message. It is also possible to use other picture identification information, e.g., picture order count, instead of frame_num to identify the target picture.

The exemplary embodiments above are based on having the SEI message in the access unit in which the temporal layer switching can occur, and indicating an access unit in the next lower temporal layer from which the decoding of the next lower temporal layer should have been started for correct temporal layer switching. Any of the embodiments above can also be implemented by having a corresponding SEI message in the access unit from which the decoding of the next lower temporal layer (temporal layer N) should be started (at the latest) for correct temporal layer switching to temporal layer N+1 at a target frame which is subsequent in decoding order compared to the access unit containing the SEI message.

One embodiment according to the SVC file format is as follows. In addition to the one-bit field is_tl_switching_point, a 32-bit field target_sample_number is added to the syntax structure ScalableGroupEntry( ). When is_tl_switching_point is equal to 1, the identified pictures are temporal layer switching points such that switching from the next lower temporal layer can be operated at any of the identified picture, if decoding of the next lower layer has started from or before the sample with a sample number equal to target_sample_number.

In one embodiment, the SVC file format is appended with an additional sample grouping type, referred to herein as temporal layer switching ("tlsw"). Samples containing a temporal layer switching point at any dependency_id are marked by being a member of a group of this grouping type. Each group entry comprises the temporal_layer of the current sample and a loop of pairs of dependency_id and roll_distance, one pair per each temporal layer switching point present in the associated sample. The value of dependency_id specifies the dependency representation at which the temporal layer switching point occurs. The value of roll_distance indicates the required dependency representation at (temporal_layer−1) relative to the sample associated to the sample group entry. The required dependency representation, and any subsequent dependency representation having the same dependency_id at and below (temporal_layer−1), must be decoded in order to enable switching of temporal layers at the indicated switching point. The required dependency representation has the sample number equal to the sample number of the sample associated to the sample group entry subtracted by the value of roll_distance. The group entry of temporal layer switching is specified as follows:

```
class TemporalLayerSwitchingEntry( ) extends VisualSampleGroupEntry
("tlsw")
{
    unsigned int(8) temporal_layer;
    unsigned int(16) entry_count;
    for (i = 1; i <= entry_count; i++) {
        unsigned int(8) dependency_id;
        unsigned int(16) roll_distance;
}
```

In one embodiment, the SVC file format is appended with an additional sample grouping type, referred to herein as temporal layer switching ("tlsw"). Samples containing a temporal layer switching point at the highest dependency_id present in the indicated sample are marked by being a member of a group of this grouping type. Each group entry comprises the temporal_layer of the current sample and roll_distance. The value of roll_distance indicates the required dependency representation at (temporal_layer−1) relative to the sample associated to the sample group entry. The required dependency representation and any subsequent dependency representation having the same highest dependency_id at and below (temporal_layer−1) must be decoded in order to enable switching of temporal layers at the indicated switching point. The required dependency representation has the sample number equal to the sample number of the sample associated to the sample group entry subtracted by the value of roll_distance. The group entry of temporal layer switching is specified as follows:

```
class TemporalLayerSwitchingEntry( ) extends VisualSampleGroupEntry
("tlsw")
{
    unsigned int(8) temporal_layer;
    unsigned int(16) roll_distance;
}
```

In one embodiment, the SVC file format is appended with a sample grouping type per each dependency_id, referred to herein as temporal layer switching, and differentiated with the value of dependency_id ranging from 0 to 7. Thus, the grouping types can be referred to as "tls1" to "tls7" and specified identically. Samples containing a temporal layer switching point at dependency_id matching with the dependency_id included in the sample grouping type are marked by being a member a group of this grouping type. Each group entry comprises the temporal_layer of the current sample and roll_distance. The value of roll_distance indicates the required dependency representation at (temporal_layer−1) relative to the sample associated to the sample group entry. The required dependency representation and any subsequent dependency representation having the same dependency_id as indicated by the grouping type at and below (temporal_layer−1) are decoded in order to enable switching of temporal layers at the indicated switching point. The required dependency representation has the sample number equal to the sample number of the sample associated to the sample group entry subtracted by the value of roll_distance. The group entry of temporal layer switching is specified as follows (where N in "tlsN" can range from 0 to 7, inclusive):

```
class TemporalLayerSwitchingEntry( ) extends VisualSampleGroupEntry
("tlsN")
{
    unsigned int(8) temporal_layer;
    unsigned int(16) roll_distance;
}
```

It is also possible to use other forms of file format level signaling. For example, a new box can be defined. This new box contains a table of sample numbers. The box also contains for each sample number, the dependency_id and quality_id values of the temporal switching point layer representations, and, for each temporal switching point layer representation or combination of dependency_id and quality_id, a target sample number value with the same semantics of the target_sample_number described above.

The embodiments above are based on indicating the pre-roll count for a temporal layer switching point. Any of the previously mentioned embodiments can also be realized with a post-roll count rather than a pre-roll count. If a post-roll count is indicated, then the sample group entry is associated to a sample that is the latest sample at temporal_id equal to N that facilitates temporal layer switching to temporal_id equal to N+1 after specified amount of post-roll samples. In other words, if the post-roll count equals to M, then a temporal layer switching initiation sample group entry indicates the latest point at which decoding of a lower temporal layer (i.e., temporal_id equal to N) must be started in order to perform temporal layer switching to temporal_id equal to N+1 after M samples relative to the temporal layer switching initiation point.

Any of the various ones of the embodiments of the present invention are applicable to multi-view video coding specified similarly to JVT-W209. For multi-view coding, the presented SEI messages may be enclosed within a multi-view scalable nesting SEI message indicating which values of view_id the presented SEI messages apply to. The SEI messages in accordance with the exemplary embodiments described above would then indicate temporal layer switching points within the indicated views.

One constraint of the multi-view video coding specified in JVT-W209 is that inter-view prediction is allowed to occur only between pictures sharing the same sampling or capture instant. In other words, a picture at view A and having an output timestamp $t_A$ cannot be predicted from a picture at view B having an output timestamp $t_B$, where A≠B and $t_A≠t_B$. However, if such "diagonal" prediction were enabled, the present invention can be extended to cover view switching points. An indication of a view switching point would include an identification (by any means presented earlier, such target frame_num, target picture order count, pre-roll count) of a picture at the view from which the view associated with the view switching point depends on, wherein the indicated picture and any later pictures at that view must be correctly decoded in order to switch views at the view switching point. It is noted also that a view may depend on multiple other views, in which case multiple target pictures or pre-roll counts should be indicated. It is also noted that, as for temporal layer switching points, the design based on pre-roll count can be changed to a design based on post-roll count.

Figure 1:
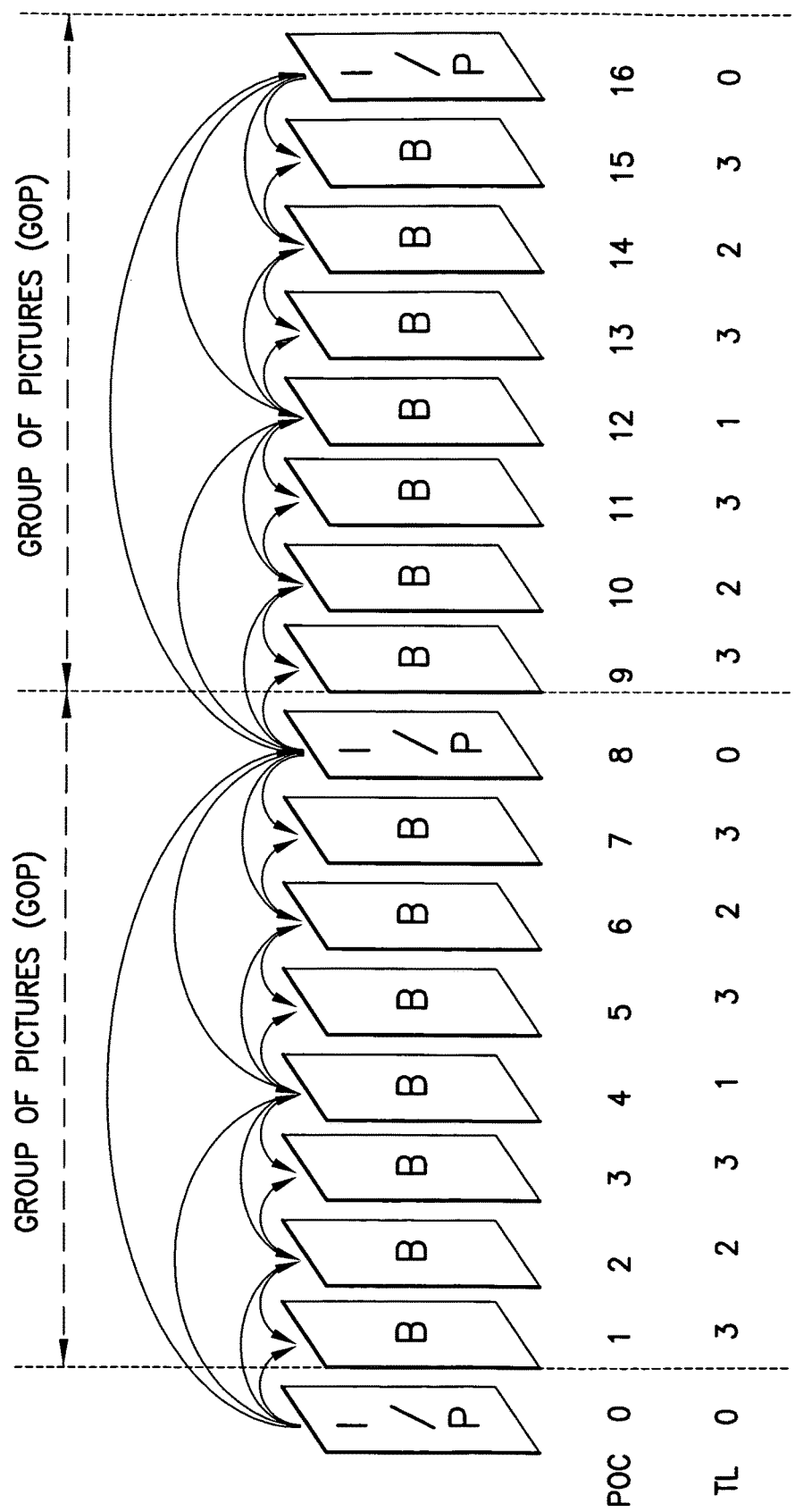
FIG. 1 is a representation of a typical hierarchical coding structure with four levels of temporal scalability.
Figure 2:
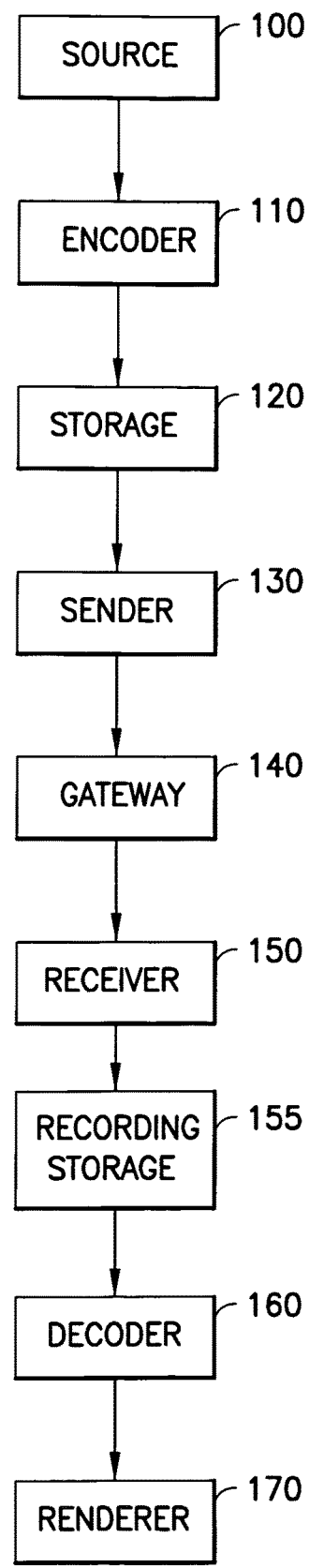
FIG. 2 is a representation of a generic multimedia communications system for use with various embodiments of the present invention.

FIG. 2 is a graphical representation of a generic multimedia communication system within which various embodiments of the present invention may be implemented. As shown in FIG. 2, a data source 100 provides a source signal in an analog, uncompressed digital, or compressed digital format, or any combination of these formats. An encoder 110 encodes the source signal into a coded media bit stream. It should be noted that a bit stream to be decoded can be received directly or indirectly from a remote device located within virtually any type of network. Additionally, the bit stream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bit streams of synthetic media. In the following, only processing of one coded media bit stream of one media type is considered to simplify the description. It should be noted, however, that typically real-time broadcast services comprise several streams (typically at least one audio, video and text sub-titling stream). It should also be noted that the system may include many encoders, but in FIG. 2 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bit stream is transferred to a storage 120. The storage 120 may comprise any type of mass memory to store the coded media bit stream. The format of the coded media bit stream in the storage 120 may be an elementary self-contained bit stream format, or one or more coded media bit streams may be encapsulated into a container file. Some systems operate "live", i.e. omit storage and transfer coded media bit stream from the encoder 110 directly to the sender 130. The coded media bit stream is then transferred to the sender 130, also referred to as the server, on a need basis. The format used in the transmission may be an elementary self-contained bit stream format, a packet stream format, or one or more coded media bit streams may be encapsulated into a container file. The encoder 110, the storage 120, and the server 130 may reside in the same physical device or they may be included in separate devices. The encoder 110 and server 130 may operate with live real-time content, in which case the coded media bit stream is typically not stored permanently, but rather buffered for small periods of time in the content encoder 110 and/or in the server 130 to smooth out variations in processing delay, transfer delay, and coded media bit rate.

The server 130 sends the coded media bit stream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bit stream into packets. For example, when RTP is used, the server 130 encapsulates the coded media bit stream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bit stream. The coded media bit stream is transferred to a recording storage 155. The recording storage 155 may comprise any type of mass memory to store the coded media bit stream. The recording storage 155 may alternatively or additively comprise computation memory, such as random access memory. The format of the coded media bit stream in the recording storage 155 may be an elementary self-contained bit stream format, or one or more coded media bit streams may be encapsulated into a container file. If there are many coded media bit streams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bit stream from the receiver 150 directly to the decoder 160. In some systems, only the most recent part of the recorded stream, e.g., the most recent 10-minutes of the recorded stream, is maintained in the recording storage 155, while any earlier recorded data is discarded from the recording storage 155.

The coded media bit stream is transferred from the recording storage 155 to the decoder 160. If there are many coded media bit streams, such as an audio stream and a video stream, associated with each other and encapsulated into a container file, a file parser (not shown in the figure) is used to decapsulate each coded media bit stream from the container file. The recording storage 155 or a decoder 160 may comprise the file parser, or the file parser is attached to either recording storage 155 or the decoder 160.

The codec media bit stream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

An encoder 100 of various embodiments of the present invention encodes a temporal scalable video bit stream including an indication of at least one temporal layer switching point from a first temporal layer to a second temporal layer. The indication includes information concerning where decoding of the first temporal layer should have started to enable switching from the first temporal layer to the second temporal layer at the at least one temporal layer switching point. Alternatively or in addition, the encoder 100 may be logically connected to a file encapsulator (not shown in the figure) encapsulating the temporal scalable video bit stream into a container file possibly with other media and metadata describing the media data. Rather than or in addition to including the indication and the information of the at least one temporal layer switching point into the bit stream, the encoder can pass the indication and the information to the file encapsulator, which stores those into the container file. Alternatively, the file encapsulator may analyze the bit stream to conclude the information of the at least one temporal layer switching point from a first temporal layer to a second temporal layer and the information concerning where decoding of the first temporal layer should have started to enable switching from the first temporal layer to the second temporal layer at the at least one temporal layer switching point.

A sender 130 according to various embodiments of the present invention may be configured to switch temporal layers for multiple reasons, such as to respond to requests of the receiver 150 or prevailing conditions of the network over which the bit stream is conveyed. The sender typically operates on the basis of the temporal layer switching points indicated in the container file, if available. A request from the receiver can be e.g. a request for a change of viewing rate ("fast forward") or a change of the trade-off between the temporal and spatial quality of the bit stream. When the transmission bit rate is not essentially changed, different viewing rates are obtained by transmitting a different temporal subset of the bit stream. Hence, a change of viewing rates typically results into a change in the number of transmitted temporal layers. The receiver 150 may send requests to the sender 130 with any control protocol, such as the real time streaming protocol (RTSP, discussed in detail at www.ietf.org/rfc/rfc2326.txt"number=2326) and the codec control messages in the RTP audio-visual profile with feedback (AVPF).

In general, communication systems can operate on best-effort basis or provide a certain level of quality of service. In a best-effort system, no guarantee on correct delivery of packets is given. If reliable delivery is desirable, transport or application layer protocols have to be used to achieve robustness in delivery. Guaranteed quality of service can be characterized in terms of guaranteed and maximum bit rate throughput, maximum bit or packet error rate, maximum end-to-end latency, and maximum end-to-end latency variation. In circuit-switched systems, the channel bit rate is typically constant, which can also be considered as a quality of service guarantee. If the channel bit rate is varying, senders have to adapt transmitted bit rate to the expected channel throughput bit rate. This is known as bit rate adaptation. As one means for bit rate adaptation, a sender 130 may select the number of transmitted temporal layers according to the prevailing throughput of the network.

In some communication systems, a gateway 150 performs similar functions as described above for the sender 130. In other words, the gateway 150 may also change the number of transmitted temporal layers based on the requests from the recipient 150 or the prevailing network conditions from the gateway 140 to the receiver 150. The gateway 150 typically operates on the basis of the temporal layer switching points indicated in the bit stream, e.g., as SEI message, because container files are usually not transmitted in real-time transmission of media streams.

A receiver 150 according to various embodiments of the present invention may reconstruct the information about temporal layer switching points from the received SEI messages into structures of the container file format used in the recording storage 155.

If the communication system is such that real-time delivery of streams is essentially omitted, i.e. the bit stream or file generated by the encoder 110 is reliably provided to the decoder 160, various embodiments of the present invention are applicable as follows. In this case, the sender 130, the gateway 140, the receiver 150, and the recording storage 155 are essentially not present in the communication system. The file or the bit stream generated by the encoder may be stored in a mass memory accessible by the decoder or the file or the bit stream may be transmitted to the decoder using a reliable transmission protocol, such as transmission control protocol (TCP). It can be desirable for the decoder 160 to switch temporal layers at least to achieve computational scalability or a fast viewing rate of the bit stream. If the decoder 160 does not have the computational resources for decoding of the entire bit stream in real-time, it may decode a temporal subset of the bit stream. As many current devices provide multi-tasking, the computational resources available for the decoder 160 may vary depending on other tasks performed simultaneously. Hence, it may be necessary to switch temporal layers. Decoding of a temporal subset of the bit stream is one means to achieve an output picture rate from the decoder 160 that is faster than the intended playback rate, and hence different speeds for fast-forward playback operation can be achieved by selecting the number of decoded temporal layers. Similarly, the achievable speed for backward playback depends on the number of decoded temporal layers.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 3:
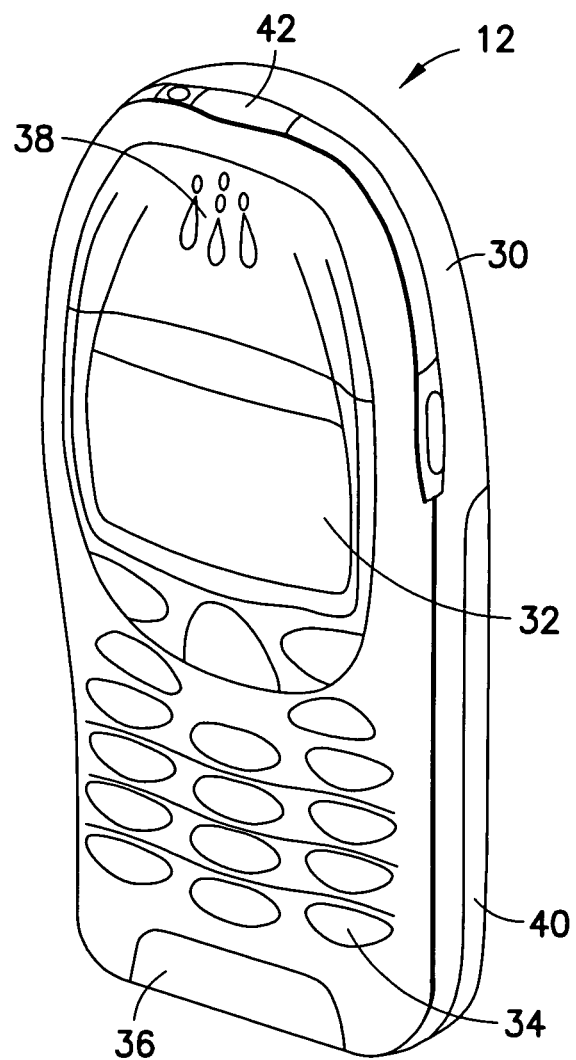
FIG. 3 is a perspective view of an electronic device that can be used in conjunction with the implementation of various embodiments of the present invention.
Figure 4:
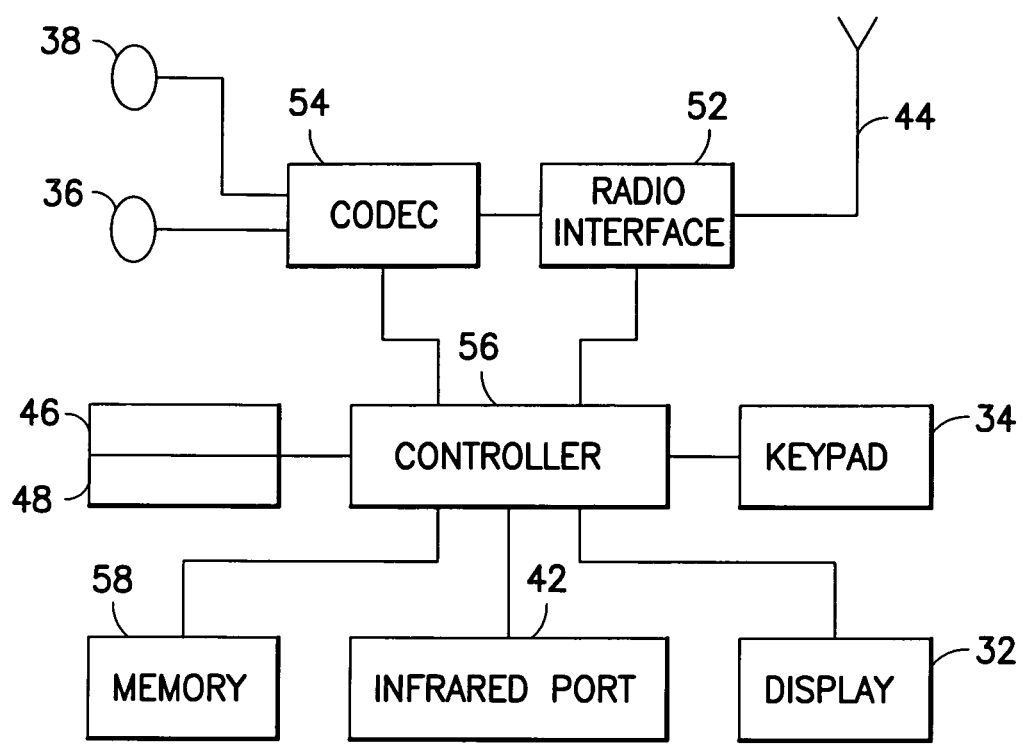
FIG. 4 is a schematic representation of the circuitry which may be included in the electronic device of FIG. 3.

FIGS. 3 and 4 show one representative mobile device 12 within which the present invention may be implemented. It should be understood, however, that the present invention is not intended to be limited to one particular type of electronic device. The mobile device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example, in mobile phones available from the assignee of this patent application.

FIG. 7 shows an exemplary logic flow diagram in accordance with an example of the disclosed embodiments. At Block 7A there is a step of encoding a temporal scalable video bit stream including an indication of at least one temporal layer switching point from a first temporal layer to a second temporal layer. At Block 7B there is a step of at least one of storing the encoded video bit stream and sending the encoded video bit stream to a decoder. In the method the indication includes information concerning where decoding of the first temporal layer should start to enable switching from the first temporal layer to the second temporal layer at the at least one temporal layer switching point.

FIG. 8 shows an exemplary logic flow diagram in accordance with another example of the disclosed embodiments. At Block 8A there is a step of receiving a temporal scalable video bit stream that includes an indication of at least one temporal layer switching point from a first temporal layer to a second temporal layer. At Block 8B there is a step of decoding the received temporal scalable video bit stream. In this method the indication includes the information concerning where decoding of the first temporal layer should start to enable switching from the first temporal layer to the second temporal layer at the at least one temporal layer switching point.

Figure 9:
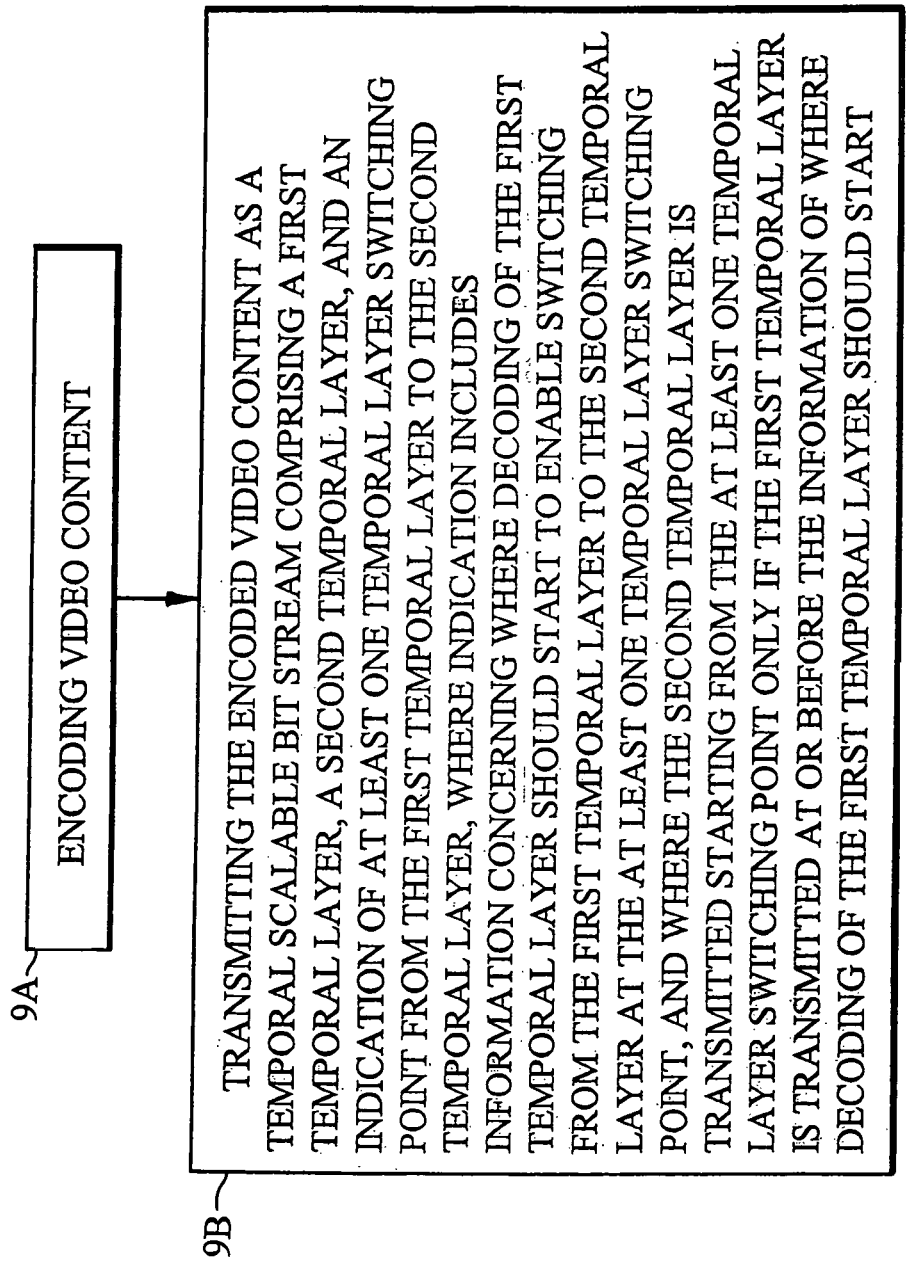

FIG. 9 shows an exemplary logic flow diagram in accordance with yet another example of the disclosed embodiments. At Block 9A there is a step of encoding video content, and at Block 9B there is a step of transmitting the encoded video content as a temporal scalable bit stream comprising a first temporal layer, a second temporal layer, and an indication of at least one temporal layer switching point from the first temporal layer to the second temporal layer. The indication includes information concerning where decoding of the first temporal layer should start to enable switching from the first temporal layer to the second temporal layer at the at least one temporal layer switching point. The second temporal layer is transmitted starting from the at least one temporal layer switching point only if the first temporal layer is transmitted at or before the information of where decoding of the first temporal layer should start.

The exemplary embodiments of this invention provide in a further aspect thereof a method that comprises providing a video bit stream, and encoding the video bit stream to include a temporal layer switching point supplemental enhancement information SEI message having the form

| tl_switching_point( payloadSize ) { | C | Descriptor |
|---|---|---|
| delta_frame_num<br>}. | 5 | se(v) |

The temporal layer switching point SEI message is associated with a layer representation and constrained by delta_frame_num, where delta_frame_num indicates a difference of frame_num values between a switch-to layer representation and a target (required) layer representation, where currFrameNum is a frame_num of the switch-to layer representation and targetFrameNum is a frame_num of a target layer representation, where targetFrameNum is set equal to currFrameNum−delta_frame_num, and where the target layer representation is a layer representation of a previous access unit, in decoding order, having frame_num equal to targetFrameNum, dependency_id equal to sei_dependency_id[i], and quality_id equal to sei_quality_id[i].

In this method tId is equal to a value of temporal_id associated with an access unit in which the temporal layer switching point SEI message is included, and a switch-to layer representation and any subsequent layer representation in decoding order for which temporal_id is equal to tId and dependency_id is less than or equal to sei_dependency_id[i], does not use any layer representation preceding the target layer representation in decoding order for which temporal_id is equal to tId−1 and dependency_id is less than or equal to sei_dependency_id[i] in a decoding process.

In this method the switch-to layer representation and any subsequent layer representation in decoding order for which temporal_id is equal to tId and dependency_id is less than or equal to sei_dependency_id[i] does not use in the decoding process any layer representation preceding the access unit containing the switch-to layer representation in decoding order for which temporal_id is equal to tId and dependency_id is less than or equal to sei_dependency_id[i].

The various embodiments described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that are capable of performing particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It should be noted that the various blocks shown in FIGS. 7, 8 and 9 may be viewed as method steps, and/or as operations that result from execution of computer program code, and/or as a plurality of coupled logic circuit elements constructed to carry out the associated function(s).

The foregoing description of a number of exemplary embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied in whole or in part as an integrated circuit, where the integrated circuit may comprise circuitry (as well as possibly firmware) for embodying at least one or more of a data processor, a digital signal processor, baseband circuitry and radio frequency circuitry, as well as video content encoder(s) and/or decoder(s) that are configurable so as to operate in accordance with the exemplary embodiments of this invention.

The various names used for the described message types, parameters and so forth are not intended to be limiting in any respect, as these various message types and parameters may be identified by any suitable names. Further, the variously described class names, code and pseudo-code instances are not intended to be limiting in any way, and in practice may differ from those expressly disclosed herein.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    encoding, with an encoder, a temporal scalable video bit stream including an indication of at least one temporal layer switching point from a first temporal layer to a second temporal layer, where the indication indicates a difference of frame number values between a current layer representation in the first temporal layer and a required layer representation in the second temporal layer, and includes information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded; and
    at least one of storing the encoded video bit stream and sending the encoded video bit stream to a decoder.

2. The method of claim 1, where the indication comprises a temporal layer switching point supplemental enhancement information message.

3. The method of claim 2, where the temporal layer switching point supplemental enhancement information message is not included in a scalable nesting supplemental enhancement information message.

4. The method of claim 3, where the temporal layer switching point supplemental enhancement information message applies to a target layer representation comprising network abstraction layer NAL units with a nal_unit_type in the range of 1 to 5, inclusive, of an access unit containing the temporal layer switching point supplemental enhancement information message.

5. The method of claim 2, where the temporal layer switching point supplemental enhancement information message is included in a scalable nesting supplemental enhancement information message.

6. The method of claim 5, where the temporal layer switching point supplemental enhancement information message applies to layer representations having dependency_id, quality_id, and temporal_id equal to dependency_id[i], quality_id[i], and temporal_id, respectively, as indicated in the scalable nesting supplemental enhancement information message.

7. The method of claim 1, where the indication comprises a box containing:
    a plurality of sample numbers;
    for each sample number, dependency_id and quality_id values for a respective temporal switching point layer representation; and
    for each combination of dependency_id and quality_id values, a target sample number.

8. A computer program embodied in a non-transitory computer-readable storage medium, configured to perform the method of claim 1.

9. The method of claim 1, where the encoder is connected to a plurality of video sources corresponding to a plurality of cameras each pointed in a fixed direction, where the first and second temporal layers comprise a group of presentations from the plurality of video sources.

10. An apparatus, comprising:
    a processor; and
    a memory communicatively connected to the processor and including computer code, the computer code executable by the processor to cause the apparatus to:
    encode a temporal scalable video bit stream including an indication of at least one temporal layer switching point from a first temporal layer to a second temporal layer, where the indication indicates a difference of frame number values between a current layer representation in the first temporal layer and a required layer representation in the second temporal layer, and includes information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded.

11. The apparatus of claim 10, where the indication comprises a temporal layer switching point supplemental enhancement information message.

12. The apparatus of claim 11, where the temporal layer switching point supplemental enhancement information message is not included in a scalable nesting supplemental enhancement information message.

13. The apparatus of claim 12, where the temporal layer switching point supplemental enhancement information message applies to a target layer representation comprising network abstraction layer NAL units with a nal_unit_type in the range of 1 to 5, inclusive, of an access unit containing the temporal layer switching point supplemental enhancement information message.

14. The apparatus of claim 11, where the temporal layer switching point supplemental enhancement information message is included in a scalable nesting supplemental enhancement information message.

15. The apparatus of claim 14, where the temporal layer switching point supplemental enhancement information message applies to layer representations having dependency_id, quality_id, and temporal_id equal to dependency_id[i], quality_id[i], and temporal_id, respectively, as indicated in the scalable nesting supplemental enhancement information message.

16. The apparatus of claim 10, where the indication comprises a box containing:
    a plurality of sample numbers;
    for each sample number, dependency_id and quality_id values for a respective temporal switching point layer representation; and
    for each combination of dependency_id and quality_id values, a target sample number.

17. An apparatus, comprising:
    means for encoding a temporal scalable video bit stream including an indication of at least one temporal layer switching point from a first temporal layer to a second temporal layer, where the indication indicates a difference of frame number values between a current layer representation in the first temporal layer and a required layer representation in the second temporal layer, and includes information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded; and means for at least one of storing the encoded video bit stream and sending the encoded video bit stream to a decoder.

18. The apparatus of claim 17, where the indication comprises a temporal layer switching point supplemental enhancement information message.

19. A method, comprising:
receiving, via an interface, a temporal scalable video bit stream that includes an indication of at least one temporal layer switching point from a first temporal layer to a second temporal layer, where the indication indicates a difference of frame number values between a current layer representation in the first temporal layer and a required layer representation in the second temporal layer and includes information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded; and decoding, based on at least the received information, the received temporal scalable video bit stream.

20. The method of claim 19, where the indication comprises a temporal layer switching point supplemental enhancement information message.

21. The method of claim 20, where the temporal layer switching point SEI message is not included in a scalable nesting supplemental enhancement information message.

22. The method of claim 21, where the temporal layer switching point supplemental enhancement information message applies to a target layer representation comprising network abstraction layer NAL units with a nal_unit_type in the range of 1 to 5, inclusive, of an access unit containing the temporal layer switching point supplemental enhancement information message.

23. The method of claim 20, where the temporal layer switching point supplemental enhancement information message is included in a scalable nesting supplemental enhancement information message.

24. The method of claim 23, where the temporal layer switching point supplemental enhancement information message applies to layer representations having dependency_id, quality_id, and temporal_id equal to dependency_id [i], quality_id[i], and temporal_id, respectively, as indicated in the scalable nesting supplemental enhancement information message.

25. The method of claim 19, where the indication comprises a box containing:
a plurality of sample numbers;
for each sample number, dependency_id and quality_id values for a respective temporal switching point layer representation; and
for each combination of dependency_id and quality_id values, a target sample number.

26. A computer program embodied in a non-transitory computer-readable storage medium, configured to perform the method of claim 19.

27. An apparatus, comprising:
a processor; and
a memory unit communicatively connected to the processor and including computer code the computer code executable by the processor to cause the apparatus to:
decode a temporal scalable video bit stream including an indication of at least one temporal layer switching point from a first temporal layer to a second temporal layer, where the indication indicates a difference of frame number values between a current layer representation in the first temporal layer and a required layer representation in the second temporal layer, and
includes information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded.

28. The apparatus of claim 27, where the indication comprises a temporal layer switching point supplemental enhancement information message.

29. The apparatus of claim 28, where the temporal layer switching point supplemental enhancement information message is not included in a scalable nesting supplemental enhancement information message.

30. The apparatus of claim 29, where the temporal layer switching point supplemental enhancement information message applies to a target layer representation comprising network abstraction layer NAL units with a nal_unit_type in the range of 1 to 5, inclusive, of an access unit containing the temporal layer switching point supplemental enhancement information message.

31. The apparatus of claim 28, where the temporal layer switching point supplemental enhancement information message is included in a scalable nesting supplemental enhancement information message.

32. The apparatus of claim 29, where the temporal layer switching point supplemental enhancement information message applies to layer representations having dependency_id, quality_id, and temporal_id equal to dependency_id [i], quality_id[i], and temporal_id, respectively, as indicated in the scalable nesting supplemental enhancement information message.

33. The apparatus of claim 27, where the indication comprises a box containing:
a plurality of sample numbers;
for each sample number, dependency_id and quality_id values for a respective temporal switching point layer representation; and
for each combination of dependency_id and quality_id values, a target sample number.

34. An apparatus, comprising:
means for receiving a temporal scalable video bit stream that includes an indication of at least one temporal layer switching point from a first temporal layer to a second temporal layer, where the indication indicates a difference of frame number values between a current layer representation in the first temporal layer and a required layer representation in the second temporal layer and includes information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded; and means for decoding the received temporal scalable video bit stream.

35. The apparatus of claim 34, where the indication comprises a temporal layer switching point supplemental enhancement information message.

36. A method, comprising:

encoding, with an encoder, video content; and transmitting the encoded video content as a temporal scalable bit stream comprising a first temporal layer, a second temporal layer, and an indication of at least one temporal layer switching point from the first temporal layer to the second temporal layer, where the indication indicates a difference of frame number values between a current layer representation in the first temporal layer and a required layer representation in the second temporal layer and the indication including information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded, and where the second temporal layer is transmitted starting from the at least one temporal layer switching point only if the first temporal layer is transmitted at or before the information of where decoding of the first temporal layer should start.

37. The method of claim 36, where the indication comprises a temporal layer switching point supplemental enhancement information message.

38. The method of claim 37, where the temporal layer switching point supplemental enhancement information message is not included in a scalable nesting supplemental enhancement information message.

39. The method of claim 38, where the temporal layer switching point supplemental enhancement information message applies to a target layer representation comprising network abstraction layer NAL units with a nal_unit_type in the range of 1 to 5, inclusive, of an access unit containing the temporal layer switching point supplemental enhancement information message.

40. The method of claim 37, where the temporal layer switching point supplemental enhancement information message is included in a scalable nesting supplemental enhancement information message.

41. The method of claim 40, where the temporal layer switching point supplemental enhancement information message applies to layer representations having dependency_id, quality_id, and temporal_id equal to dependency_id [i], quality_id[i], and temporal_id, respectively, as indicated in the scalable nesting supplemental enhancement information message.

42. The method of claim 36, where the indication comprises a box containing:

a plurality of sample numbers;

for each sample number, dependency_id and quality_id values for a respective temporal switching point layer representation; and for each combination of dependency_id and quality_id values, a target sample number.

43. A computer program embodied in a non-transitory computer-readable storage medium, configured to perform the method of claim 36.

44. An apparatus, comprising:

a processor; and a memory unit communicatively connected to the processor and including computer code the computer code executable by the processor to cause the apparatus to:

transmit a temporal scalable bit stream comprising a first temporal layer, a second temporal layer, and an indication of at least one temporal layer switching point from the first temporal layer to the second temporal layer, where the indication indicates a difference of frame number values between a current layer representation in the first temporal layer and a required layer representation in the second temporal layer and the indication including information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded, and where the second temporal layer is transmitted starting from the at least one temporal layer switching point only if the first temporal layer is transmitted at or before the information of where decoding of the first temporal layer should start.

45. The apparatus of claim 44, where the indication comprises a temporal layer switching point supplemental enhancement information message.

46. The apparatus of claim 45, where the temporal layer switching point supplemental enhancement information message is not included in a scalable nesting supplemental enhancement information message.

47. The apparatus of claim 46, where the temporal layer switching point supplemental enhancement information message applies to a target layer representation comprising network abstraction layer NAL units with a nal_unit_type in the range of 1 to 5, inclusive, of an access unit containing the temporal layer switching point supplemental enhancement information message.

48. The apparatus of claim 45, where the temporal layer switching point supplemental enhancement information message is included in a scalable nesting supplemental enhancement information message.

49. The apparatus of claim 48, where the temporal layer switching point supplemental enhancement information message applies to layer representations having dependency_id, quality_id, and temporal_id equal to dependency_id [i], quality_id[i], and temporal_id, respectively, as indicated in the scalable nesting supplemental enhancement information message.

50. The apparatus of claim 44, where the indication comprises a box containing:

a plurality of sample numbers;

for each sample number, dependency_id and quality_id values for a respective temporal switching point layer representation; and for each combination of dependency_id and quality_id values, a target sample number.

51. An apparatus, comprising:

means for encoding video content; and means for transmitting the encoded video content as a temporal scalable bit stream comprising a first temporal layer, a second temporal layer, and an indication of at least one temporal layer switching point from the first temporal layer to the second temporal layer, where the indication indicates a difference of frame number values between a current layer representation in the first temporal layer and a required layer representation in the second temporal layer and the indication including information concerning where decoding of the first temporal layer should start to enable switching from the first temporal layer to the second temporal layer at the at least one temporal layer switching point, and wherein the indication determines where to perform temporal layer switching after which pictures in the temporal scalable video bit stream can be correctly decoded, and where the second temporal layer is transmitted starting from the at least one temporal layer switching point only if the first temporal layer is transmitted at or before the information of where decoding of the first temporal layer should start.

52. The apparatus of claim 51, where the indication comprises a temporal layer switching point supplemental enhancement information message.

53. A method, comprising:

providing a video bit stream; and encoding, with an encoder, the video bit stream to include a temporal layer switching point supplemental enhancement information message having the form

| tl_switching_point( payloadSize ) { | C | Descriptor |
|---|---|---|
| delta_frame_num | 5 | se(v) |
| }; | | | the temporal layer switching point supplemental enhancement information message being associated with a layer representation and constrained by delta_frame_num, where delta_frame_num indicates a difference of frame_num values between a switch-to layer representation and a target layer representation, wherein currFrameNum is a frame_num of the switch-to layer representation and targetFrameNum is a frame_num of a target layer representation, where targetFrameNum is set equal to currFrameNum−delta_frame_num, and where the target layer representation is a layer representation of a previous access unit, in decoding order, having frame_num equal to targetFrameNum, dependency_id equal to sei_dependency_id[i], and quality_id equal to sei_quality_id[i]; and at least one of storing the encoded video bit stream and sending the encoded video bit stream to a decoder.

54. The method of claim 53, where tId is equal to a value of temporal_id associated with an access unit in which the temporal layer switching point supplemental enhancement information message is included, and where a switch-to layer representation and any subsequent layer representation in decoding order for which temporal_id is equal to tId and dependency_id is less than or equal to sei_dependency_id[i], does not use any layer representation preceding the target layer representation in decoding order for which temporal_id is equal to tId−1 and dependency_id is less than or equal to sei_dependency_id[i] in a decoding process.

55. The method of claim 54, where the switch-to layer representation and any subsequent layer representation in decoding order for which temporal_id is equal to tId and dependency_id is less than or equal to sei_dependency_id[i] does not use in the decoding process any layer representation preceding the access unit containing the switch-to layer representation in decoding order for which temporal_id is equal to tId and dependency_id is less than or equal to sei_dependency_id[i].

* * * * *